United States Patent
Hunter et al.

(10) Patent No.: US 9,990,398 B2
(45) Date of Patent: Jun. 5, 2018

(54) INFERRING DIMENSIONAL METADATA FROM CONTENT OF A QUERY

(71) Applicant: Oracle International Corporation, Redwood Shores, CA (US)

(72) Inventors: James Hunter, Redwood Shores, CA (US); Adam Kociubes, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 83 days.

(21) Appl. No.: 14/033,285

(22) Filed: Sep. 20, 2013

(65) Prior Publication Data
US 2015/0088856 A1  Mar. 26, 2015

(51) Int. Cl.
*G06F 7/00* (2006.01)
*G06F 17/30* (2006.01)

(52) U.S. Cl.
CPC .............. *G06F 17/30466* (2013.01)

(58) Field of Classification Search
CPC ............ G06F 17/30592; G06F 17/30448
USPC ............................................. 707/714
See application file for complete search history.

(56) References Cited

U.S. PATENT DOCUMENTS

| | | | |
|---|---|---|---|
| 5,359,724 A | 10/1994 | Earle | |
| 5,848,408 A | 12/1998 | Jackobsson | |
| 5,905,985 A * | 5/1999 | Malloy | G06F 17/30592 |
| 5,943,666 A | 8/1999 | Kleewein | |
| 5,960,428 A * | 9/1999 | Lindsay | G06F 17/30466 |
| 6,298,342 B1 | 10/2001 | Graefe | |
| 6,317,750 B1 | 11/2001 | Tortolani et al. | |
| 6,341,281 B1 | 1/2002 | MacNicol | |
| 6,345,267 B1 | 2/2002 | Lohman | |
| 6,353,828 B1 * | 3/2002 | Ganesh | G06F 17/30362 |
| 6,397,195 B1 | 5/2002 | Pinard et al. | |
| 6,397,204 B1 * | 5/2002 | Liu | G06F 17/30466 |

(Continued)

OTHER PUBLICATIONS

U.S. Appl. No. 13/587,897, filed Aug. 16, 2012, Notice of Allowance, dated Apr. 7, 2014.

(Continued)

*Primary Examiner* — Binh V Ho
(74) *Attorney, Agent, or Firm* — Hickman Palermo Becker Bingham LLP

(57) ABSTRACT

Methods, computer systems, and stored instructions are described herein for inferring dimensional metadata from content of a query that references tables. A server analyzes the content of the query to determine which table(s) of the referenced tables could be fact tables and/or which table(s) of the referenced tables could be dimension tables. The server transforms the query to a transformed query that operates on a candidate fact table and candidate dimension table(s) of the referenced tables other than the candidate fact table. The transformed query, when executed, processes at least some data from dimension(s) using the candidate dimension table(s) before processing at least some data from the candidate fact table. Alternatively or additionally, the server generates an execution plan that operates on the candidate fact table and the candidate dimension table(s). The execution plan, when performed, processes data from dimension(s) using the candidate dimension table(s) before processing data from the candidate fact table.

24 Claims, 5 Drawing Sheets

(56) References Cited

U.S. PATENT DOCUMENTS

| | | | |
|---|---|---|---|
| 6,405,208 B1 | 6/2002 | Raghavan et al. | |
| 6,385,604 B1 | 7/2002 | Bakalash et al. | |
| 6,446,063 B1* | 9/2002 | Chen | G06F 17/30466 |
| 6,460,045 B1 | 10/2002 | Aboulnaga et al. | |
| 6,484,179 B1 | 11/2002 | Roccaforte | |
| 6,529,896 B1 | 3/2003 | Leung et al. | |
| 6,618,729 B1 | 9/2003 | Bhashyam et al. | |
| 6,711,563 B1 | 3/2004 | Koskas | |
| 6,775,682 B1 | 8/2004 | Ballamkonda | |
| 6,959,304 B1 | 10/2005 | Teig et al. | |
| 6,965,891 B1* | 11/2005 | Jakobsson | G06F 17/3033 707/714 |
| 7,028,046 B2 | 4/2006 | Anjur et al. | |
| 7,324,991 B1 | 1/2008 | Anjur | |
| 7,337,163 B1 | 2/2008 | Srinivasan | |
| 7,366,730 B2 | 4/2008 | Greenfield et al. | |
| 7,392,248 B2 | 6/2008 | Bakalash | |
| 7,467,127 B1 | 12/2008 | Baccash et al. | |
| 7,617,312 B2 | 11/2009 | Tummalapalli | |
| 7,725,425 B2 | 5/2010 | Smartt | |
| 7,734,652 B2 | 6/2010 | Tamayo | |
| 7,769,733 B2 | 8/2010 | Chen et al. | |
| 7,774,303 B2 | 8/2010 | Shoup | |
| 7,797,320 B2 | 9/2010 | Thomsen | |
| 8,001,112 B2 | 8/2011 | Dombroski et al. | |
| 8,041,670 B2 | 10/2011 | Bakalash | |
| 8,200,612 B2 | 6/2012 | Soylemez | |
| 8,209,208 B2 | 6/2012 | Kearney et al. | |
| 8,311,975 B1* | 11/2012 | Gonsalves | G06F 17/30592 707/606 |
| 8,554,761 B1* | 10/2013 | Ahmed | G06F 17/30454 707/714 |
| 8,788,453 B2 | 7/2014 | Bakalash | |
| 8,799,209 B2 | 8/2014 | Bakalash | |
| 9,183,254 B1 | 11/2015 | Cole | |
| 2002/0095397 A1 | 7/2002 | Koskas | |
| 2002/0095421 A1 | 7/2002 | Koskas | |
| 2003/0131215 A1* | 7/2003 | Bellew | G06F 17/30392 712/200 |
| 2003/0208484 A1 | 11/2003 | Chang | |
| 2004/0153435 A1 | 8/2004 | Gudbjartsson et al. | |
| 2004/0225639 A1* | 11/2004 | Jakobsson | G06F 17/30463 |
| 2004/0236786 A1* | 11/2004 | Medicke | G06Q 10/00 |
| 2005/0033741 A1 | 2/2005 | Dombroski et al. | |
| 2006/0026115 A1 | 2/2006 | Ahmed | |
| 2006/0101001 A1 | 5/2006 | Lindsay | |
| 2006/0184519 A1 | 8/2006 | Smartt | |
| 2006/0235823 A1* | 10/2006 | Chong | G06F 17/30557 |
| 2007/0027860 A1* | 2/2007 | Bestgen | G06F 17/30433 |
| 2007/0083489 A1* | 4/2007 | Lawande | G06F 17/30457 |
| 2007/0233648 A1* | 10/2007 | Zuzarte | G06F 17/30536 |
| 2007/0239673 A1* | 10/2007 | Barsness | G06F 17/30463 |
| 2007/0250473 A1 | 10/2007 | Larson | |
| 2008/0059415 A1 | 3/2008 | Bakalash | |
| 2008/0172354 A1* | 7/2008 | Zuzarte | G06F 17/30469 |
| 2008/0215544 A1* | 9/2008 | Galindo-Legaria | G06F 17/30321 |
| 2009/0019017 A1* | 1/2009 | Chaves | G06F 17/30448 |
| 2009/0112793 A1* | 4/2009 | Ahmed | G06F 17/30498 |
| 2009/0182720 A1 | 7/2009 | Cain et al. | |
| 2009/0265335 A1* | 10/2009 | Hoffman | G06F 17/30592 |
| 2009/0281985 A1* | 11/2009 | Aggarwal | G06F 17/30489 |
| 2010/0299337 A1* | 11/2010 | Aurin | G06F 17/30442 707/759 |
| 2010/0299367 A1 | 11/2010 | Chakrabarti et al. | |
| 2011/0040745 A1* | 2/2011 | Zaydman | G06F 17/30595 707/714 |
| 2011/0055246 A1 | 3/2011 | Le Biannic et al. | |
| 2011/0137917 A1 | 6/2011 | Boland et al. | |
| 2011/0145244 A1 | 6/2011 | Kim et al. | |
| 2011/0173164 A1* | 7/2011 | Bendel | G06F 17/30501 707/693 |
| 2011/0196857 A1* | 8/2011 | Chen | G06F 17/30457 707/714 |
| 2011/0282864 A1* | 11/2011 | Collins | G06F 17/30448 707/719 |
| 2012/0296942 A1* | 11/2012 | Arora | G06F 17/30926 707/807 |
| 2013/0006965 A1 | 1/2013 | Barbas | |
| 2013/0060547 A1 | 3/2013 | Beran et al. | |
| 2013/0117255 A1* | 5/2013 | Liu | G06F 17/30498 707/714 |
| 2013/0173528 A1* | 7/2013 | Betawadkar-Norwood | G06F 17/30451 707/602 |
| 2013/0198165 A1* | 8/2013 | Cheng | G06F 17/30463 707/714 |
| 2013/0275364 A1* | 10/2013 | Wang | G06F 17/30592 707/602 |
| 2013/0275367 A1* | 10/2013 | Shuma | G06F 17/30595 707/609 |
| 2014/0052711 A1 | 2/2014 | Bamba et al. | |
| 2014/0095502 A1* | 4/2014 | Ziauddin | G06F 17/30289 707/737 |
| 2014/0095534 A1* | 4/2014 | Aingaran | G06F 17/30501 707/769 |
| 2014/0101201 A1* | 4/2014 | Yan | G06F 17/30557 707/776 |
| 2014/0181072 A1 | 6/2014 | Wong | |
| 2014/0214796 A1* | 7/2014 | Barber | G06F 17/30466 707/714 |
| 2014/0372438 A1* | 12/2014 | Chandramouli | G06F 17/30598 707/737 |
| 2015/0088795 A1 | 3/2015 | Golovashkin et al. | |
| 2015/0088809 A1 | 3/2015 | Kociubes et al. | |
| 2015/0088885 A1 | 3/2015 | Hopeman, IV et al. | |
| 2015/0088919 A1 | 3/2015 | Hunter et al. | |

OTHER PUBLICATIONS

U.S. Appl. No. 14/033,358, filed Sep. 20, 2013, Office Action, dated Jun. 1, 2015.

U.S. Appl. No. 10/944,169, filed Sep. 16, 2004, Notice of Allowance, dated Sep. 30, 2013.

U.S. Appl. No. 13/587,897, filed Aug. 16, 2012, Office Action, dated Nov. 25, 2013.

U.S. Appl. No. 14/033,358, filed Sep. 20, 2013, Final Office Action, dated Nov. 10, 2015.

U.S. Appl. No. 14/033,251, filed Sep. 20, 2013, Final Office Action, dated Dec. 21, 2015.

U.S. Appl. No. 14/033,251, filed Jan. 22, 2016, Interview Summary, dated Jan. 22, 2016.

U.S. Appl. No. 14/033,358, filed Sep. 20, 2013, Office Action, dated Apr. 6, 2016.

U.S. Appl. No. 14/033,251, filed Sep. 20, 2013, Office Action, dated May 27, 2016.

U.S. Appl. No. 14/033,271, filed Sep. 20, 2013, Final Office Action, dated Mar. 15, 2016.

U.S. Appl. No. 14/033,271, filed Sep. 20, 2013, Interview Summary, dated Aug. 18, 2016.

U.S. Appl. No. 14/033,251, filed Sep. 20, 2013, Interview Summary, dated Aug. 16, 2016.

U.S. Appl. No. 14/033,358, filed Sep. 20, 2013, Final Office Action, dated Oct. 5, 2016.

U.S. Appl. No. 14/033,358, filed Sep. 20, 2013, Advisory Action, dated Jan. 19, 2017.

Kociubes, U.S. Appl. No. 14/033,271, filed Sep. 20, 2013, Interview Summary, dated Jan. 30, 2017.

Hunter, U.S. Appl. No. 14/033,358, filed Sep. 20, 2013, Interview Summary, dated Dec. 21, 2016.

Hopeman IV, U.S. Appl. No. 14/033,251, filed Sep. 20, 2013, Interview Summary, dated Dec. 27, 2016.

Kociubes, U.S. Appl. No. 14/033,271, filed Sep. 20, 2013, Final Office Action, dated Apr. 12, 2017.

Hunter, U.S. Appl. No. 14/033,358, filed Sep. 20, 2013, Office Action, dated Mar. 9, 2017.

Hopeman, U.S. Appl. No. 14/033,251, filed Sep. 20, 2013, Notice of Allowance, dated Apr. 12, 2017.

(56) References Cited

OTHER PUBLICATIONS

Kociubes, U.S. Appl. No. 14/033,271, filed Sep. 20, 2013, Notice of Allowance, dated Aug. 2, 2017.
MSDN Library, "Dimension Set Entries", NAV 2013 Documentation, dated Nov. 21, 2012, Retrieved on Sep. 13, 2017, 22 pages.
Hunter, U.S. Appl. No. 14/033,358, filed Sep. 20, 2013, Final Office Action, dated Sep. 21, 2017.
Hunter, U.S. Appl. No. 14/033,358, filed Sep. 20, 2017, Interview Summary, dated Dec. 11, 2017.

* cited by examiner

FIGURE 1

PROD TABLE 104

| MFG | CAT | SUBCAT | PID |
|---|---|---|---|
| GE | APPLIANCE | WASHER | 4 |
| GE | APPLIANCE | DRYER | 3 |
| ... | ... | ... | ... |
| GE | ELECTRIC | BULB | 8 |
| GE | ELECTRIC | SWITCH | 6 |
| ... | ... | ... | ... |

SALES TABLE 102

| TID | GID | PID | QTY |
|---|---|---|---|
| 1 | 2 | 8 | 50 |
| 2 | 3 | 4 | 12 |
| 3 | 6 | 8 | 40 |
| 4 | 6 | 6 | 30 |
| 5 | 7 | 6 | 35 |
| 6 | 8 | 3 | 8 |
| 7 | 2 | 6 | 40 |
| 8 | 1 | 5 | 6 |
| 9 | 7 | 8 | 60 |
| 10 | 2 | 8 | 20 |
| 11 | 7 | 8 | 45 |
| 12 | ... | ... | ... |

GEOG TABLE 106

| COUNTRY | STATE | CITY | GID |
|---|---|---|---|
| USA | WA | SEATTLE | 2 |
| USA | WA | SPOKANE | 3 |
| ... | ... | ... | ... |
| USA | CA | SF | 7 |
| USA | CA | LA | 8 |
| ... | ... | ... | ... |

STORAGE DEVICE(S) 100

FIGURE 4

STORAGE DEVICE(S) 400

SALES TABLE 402

| TID | GID | PID | QTY |
|-----|-----|-----|-----|
| 1 | 2 | 8 | 50 |
| 2 | 3 | 4 | 12 |
| 3 | 6 | 8 | 40 |
| 4 | 6 | 6 | 30 |
| 5 | 7 | 6 | 35 |
| 6 | 8 | 3 | 8 |
| 7 | 2 | 6 | 40 |
| 8 | 1 | 5 | 6 |
| 9 | 7 | 8 | 60 |
| 10 | 2 | 8 | 20 |
| 11 | 7 | 8 | 45 |
| 12 | ... | ... | ... |

DATA STRUCTURE 408

| RIDP | DSIP |
|------|------|
| 3 | 1 |
| 4 | 1 |
| ... | ... |
| 6 | 2 |
| ... | ... |
| 8 | 2 |

DATA STRUCTURE 410

| RIDG | DSIG |
|------|------|
| 2 | 1 |
| 3 | 1 |
| ... | ... |
| 7 | 2 |
| 8 | 2 |
| ... | ... |

DATA STRUCTURE 412

| DSIP \ DSIG | 1 | 2 |
|---|---|---|
| 1 | | 12 |
| 2 | 110 | 8 |
|  | 140 | |

INFERRING DIMENSIONAL METADATA FROM CONTENT OF A QUERY

CROSS-REFERENCE TO RELATED APPLICATIONS

The present application is related to U.S. patent application Ser. No. 14/033,251 entitled "Aggregating Dimensional Data Using Dense Containers", Ser. No. 14/033,358 entitled "Transforming A Query To Reuse Stored Data", and Ser. No. 14/033,271 entitled "Densely Grouping Dimensional Data", filed Sep. 20, 2013, the entire contents of which are incorporated by reference as if fully set forth herein.

FIELD OF THE INVENTION

The present invention relates to densely grouping dimensional data

BACKGROUND

Storing Multidimensional Data

Database systems are often designed to maintain huge amounts of information about a variety of entities, events, or occurrences (referred to generally as occurrences), and these occurrences may be described by a variety of characteristics. Even database systems that do not yet contain huge amounts of information are often designed to be scalable such that the database systems can be adapted to accommodate huge amounts of information. Huge tables, which may include every occurrence and every characteristic of every occurrence, may be impossible to analyze if there are not enough resources to store and process significant portions of these tables. Even if sufficient resources are available, storing and processing significant portions of these huge tables can be quite costly. As a result, when occurrences have many characteristics or are otherwise related to a variety of information, many database systems separate such information about the occurrences into multiple tables.

Database systems often group information into tables based on categories of characteristics. Much of the information may be descriptive information about entities, categories, or classes of information (referred to generally as categories) involved in the occurrences. The description of these underlying categories may change infrequently compared to the other tables that record or measure the occurrences themselves. Dimension tables are tables that contain descriptive information about occurrences that are referenced by or may be referenced by other table(s). The other table(s) include column(s) that reference row(s) of the dimension table(s), and each referencing column identifies what is referred to as a dimension of column(s) that occur in dimension table(s). Data that is organized into two or more dimensions is referred to herein as multidimensional data.

Fact tables are the other tables that measure the occurrences related to the categories. In other words, fact tables store facts or measurable quantitative data, and this measurable data may be involved with or otherwise fall under the categories. By referencing the dimension tables, the fact tables do not need to duplicate all of the information contained in the dimension tables. Generally, because fact tables may include multiple occurrence(s) that reference the same category, fact tables are usually larger than dimension tables. Also, because fact tables measure the occurrences rather than recording the definitions, the fact tables are usually updated more frequently than dimension tables. An organization of multidimensional data into fact table(s) and dimension table(s) is referred to as a star schema.

In various examples, dimensions may range from five, to tens of thousands, to millions of rows, and the fact table could be from millions to billions of rows.

In one example, a product may be defined and described in one table, and that product as well as other products may appear in sales records of a sales table. Customers may also be described in one table and referenced in the sales table. The sales records in the sales table may correspond to occurrences of sales by a business, and, in particular, may identify which products and customers were involved in the respective sales. The sales records might not provide much if any other description of the products or customers that were involved in the respective sales. Instead, the sales records may refer to the customers and products tables using keys.

A foreign key is a key that is used by a fact table to refer to a candidate key of a dimension table, and the candidate key uniquely identifies records in the dimension table. The foreign key and the candidate key may be the same key or may be mapped to each other according to a mapping.

Tables 102, 104, and 106 of FIG. 1 illustrate an exemplary star schema with two dimensions. As shown, storage device(s) 100 store(s) tables 102, 104 and 106. Table 102 is named "SALES" and contains information about sales that occurred for a business. Each row in sales table 102 contains a unique transaction id (TID) and information about how many units were sold (QTY). Table 104 is named "PROD" and contains information about each type of product that may be sold in any of the stores. Each row in products table 104 contains a unique product-id (PID) and information about the particular product. Table 106 is named "GEOG" and contains information about locations where products may be sold. Each row in geography table 106 contains a unique geography-id (GID) and information about the location.

Sales table 102 also includes the PID and GID columns, which map to corresponding rows in the product table 104 and geography table 106, respectively. For each row in sales table 102, the PID column indicates the type of product that was sold in a particular transaction, and the GID column indicates where the product was sold. The number of transactions may be vastly greater than both the number of locations and the number of products carried by the stores. Detailed information about the product and location involved in a sale transaction does not have to be stored in the rows of table 102 because such detailed information is available in tables 104 and 106, respectively. Instead, the rows of table 102 simply contain values (GIDs and PIDs) that reference information stored in the other tables 104 and 106. Therefore, tables 102, 104 and 106 constitute a star schema in which table 102 is the fact table and tables 104 and 106 are dimension tables.

The data stored in fact table 102 has only two dimensions, and therefore fact table 102 has only two columns dedicated to storing foreign key values for those dimensions. In general, a fact table must dedicate one column for storing foreign key values for each of the dimensions associated with the multidimensional data stored in the fact table. Thus, a fact table that stores data associated with twenty dimensions would dedicate twenty columns to the storage of foreign key values.

Data stored in relational database systems ("ROLAP" systems), for example, according to a star schema, is accessible to all applications that support interaction with such relational systems. Such database applications communicate with the relational database system by submitting commands that conform to the database language supported by the relational database system, the most common of which is the Structured Query Language (SQL). However, relational queries are not designed to handle multidimensional data because relational queries join two tables at a time using local join operations.

Multidimensional data may alternatively be stored in specialized, multidimensional database systems ("MOLAP" systems). Multidimensional database systems provide structures and access techniques specifically designed for multidimensional data. When data is stored in specialized multidimensional database systems, only applications that are specially built to interact with those multidimensional database systems are able to access and manipulate the data. Also, multidimensional star queries describe an entire cube of data before further processing even if the queries request data from only a small portion of the cube.

An alternative approach to managing multidimensional data in a relational database involves storing the data in relational files but maintaining all multidimensional structure, metadata, administration, and access control using multidimensional database system techniques. Accessing relationally-stored data using multidimensional techniques poses numerous difficulties. For example, when all administration and access to the multidimensional data are controlled exclusively through the multidimensional database system engine, two database management systems must be administered. Further, database applications that access data using conventional relational commands (e.g. SQL commands) are unable to access the multidimensional data.

Querying Multidimensional Data

A query is an expression, command, or set of commands that, when executed, causes a server to perform an operation on a set of data. A query may be processed in a predictable order by query processors. For example, the order of precedence may be FROM, WHERE, GROUP BY, HAVING, SELECT, and ORDER BY. Query processors may vary the order if varying the order is predicted to be more efficient as long as the varying the order would not change a result of the query.

In query optimization, a query optimizer or other query processor may transform queries from one form to another form as long as the two forms are semantically equivalent to each other. As used herein, a query is "transformed" when the query is (a) rewritten from a first form to a second form, (b) received in a manner that specifies a first set of operations, such as a first form or a first execution plan, and executed or planned for execution using a second set of operations, such as the operations specified by a second form or second execution plan. An execution plan is a set of directives, such as a query tree structure, that is prepared for an execution engine. Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by the query or execution plan, if executed.

Queries that operate on data stored in tables that belong to a star schema are referred to as star queries. Star queries often request information from a fact table with constraints that are based on characteristics listed in the dimension tables. For example, a star query may request all sales records that involved customers between the ages of 25 and 30. Although the fact table may include all sales records and identify the customers involved in those sales, the fact table likely does not list the respective ages of those customers. Therefore, evaluation of the star query requires a determination of which fact table records identify customers that fall within the requested ages. Such a determination may consume significant amounts of resources for large fact tables and multiple constraints.

In one example, the following SQL query, Query 1, may be evaluated to determine the dates of all sales of products that cost more than $1,000 from stores in San Jose.

---

QUERY 1 select sales.date from sales, stores, products
where sales.store-id = stores.store-id
and sales.product-id = products.product-id
and stores.city = San Jose
and products.cost > $1,000

---

To speed up query evaluation, a query may be executed using indexes, materialized views, or solved cubes that are built using data from the dimension tables and the fact table. For example, Query 1 may be executed by (1) using an index built on the city column of the stores table 102 to determine the set of all of the stores that are in San Jose ("SET1"), (2) using an index built on the cost column of the products table 104 to determine the set of all of the products that cost more than $1,000 ("SET2"), and (3) using an index built on the store-id, product-id columns of the sales table 106 to determine all rows that include both a store-id from SET1 and a product-id from SET 2.

Unfortunately, these methods of executing star queries have significant drawbacks. Specifically, building indexes, materialized views, or solved cubes for each possible combination of fact table columns may be cost prohibitive, especially when there are many dimensions and the fact table contains numerous foreign key columns. If indexes or materialized views are not built for all combinations of columns, then an index or materialized view built on the exact columns of the fact table that are constrained by any given query may not exist.

Additionally, indexes or materialized views built on a superset of the columns constrained by a query are not always helpful. For example, an index built on key1, key2, key3 is useless for a query that does not specify a constraint for key1. Use of indexes built on a subset of the columns constrained by a query may not be efficient either. For example, if an index exists for the "store-id" column of sales table 106, but not for the store-id, product-id columns, then all of the rows in the sales table 106 that contain store-ids from SET1 would have to be retrieved and inspected to determine if they also contain product-ids from SET2. Since each constraint alone may not significantly constrain the query, conventional join techniques typically require scanning a large portion of the fact table when only a very small number of the rows in the fact table actually satisfy all of the constraints of the query.

Another problem with the method of executing star queries described above is that the number of value combinations that satisfy the specified criteria may be vastly larger than the actual number of rows that satisfy the specified criteria. For example, there may be 50,000 products that cost more than $1,000 and there may be 50 stores in San Jose. However, products that cost more than $1,000 may have been sold only three times in San Jose. In the example, the store-id, product-id index would be accessed for 250,000 combinations of store-id, product-id in order to find the three rows that actually satisfy the criteria specified in the query. Further, the number of combinations that must be tested increases greatly as the number of dimension tables referenced by the query increases.

An alternative approach to executing star queries is described in Graefe, G. O'Neil, P. E. "Multiple-table Joins Through Bitmapped Join Indices", SIGMOD Record, Vol. 24, No. 3, September, 1995. According to this approach, a "join index" is used to access the fact table. A join index assumes a join on a particular set of columns between the fact table and one or more dimension tables. If the join is between the fact table and a dimension table on the normal join columns, it is possible to create a join index for other dimension table columns and the fact table.

A join index has index entries that may have the form <key, bitmap>, where "key" is a value from the dimension table column on which the index is built, and "bitmap" is a bitmap of the fact table indicating those rows in the fact table that would match the key according to the assumed join. Alternatively, the join index can have the format <rowid, bitmap>, where "rowid" identifies a particular row in a dimension table and "bitmap" represents the fact table rows that join with the particular row in the dimension table. Join indexes may also employ an actual list of rowids instead of bitmaps in the index entries.

Creating a join index is tantamount to precomputing a join. Join indexes may greatly increase the cost and/or complexity of doing updates and loading new data, as the join indexes would also need to be updated.

Another approach for processing star queries is to transform the star query to add subqueries that are based on join predicates and constraints on dimension tables that are contained in the original query. The subqueries are executed, and the values returned by the subqueries are used to access one or more bitmap indexes built on columns of the fact table. The bitmaps retrieved for the values returned by each subquery are merged to create one subquery bitmap per subquery. An AND operation is performed on the subquery bitmaps, and the resulting bitmap is used to determine which data to retrieve from the fact table.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 illustrates example data arranged according to an example star schema.

FIG. 4 illustrates an example data structure that was created based on dimension tables to store aggregate data gathered from the fact table.

DETAILED DESCRIPTION

Figure 2:
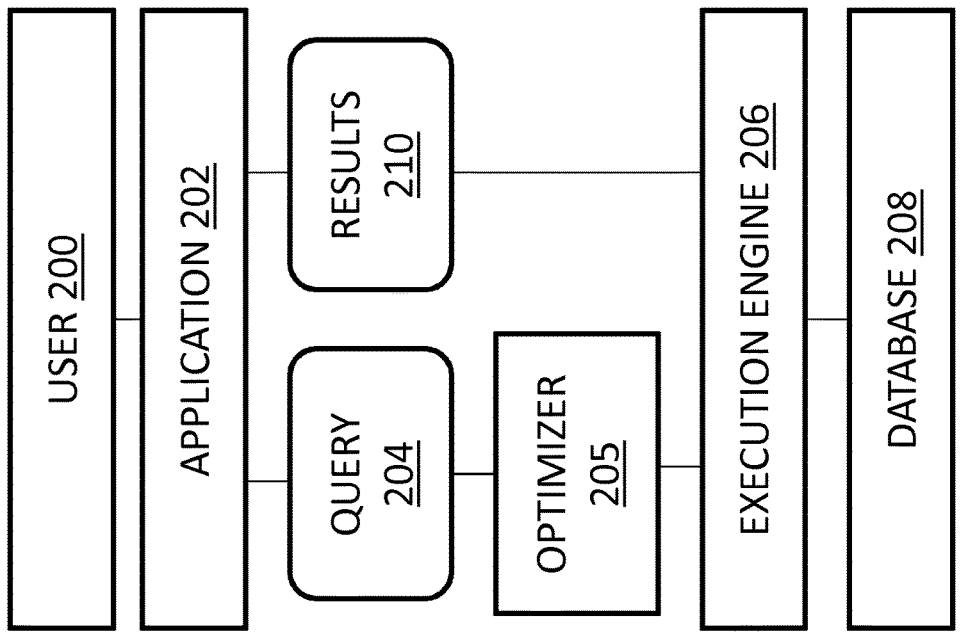
FIG. 2 illustrates an example server-client system for analyzing queries, transforming queries, and executing queries against a database.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Methods, computer systems, and stored instructions are described herein for inferring dimensional metadata from the content of a query that references tables. A query processor analyzes the content of the query to determine which table(s) of the referenced tables could be fact tables (i.e., which tables are candidate fact tables) and/or which table(s) of the referenced tables could be dimension tables (i.e., which tables are candidate dimension tables). Based at least in part on determining which of the referenced tables could be fact tables, the query processor transforms the query to a transformed query that operates on a candidate fact table and candidate dimension table(s) of the referenced tables other than the candidate fact table. The transformed query, when executed, processes data from at least one dimension using at least one of the candidate dimension table(s) before processing data from the candidate fact table. Alternatively or additionally, the query processor generates an execution plan that operates on the candidate fact table and the candidate dimension table(s). The execution plan, when performed, processes data from at least one dimension using at least one of the candidate dimension table(s) before processing data from the candidate fact table.

The transformed query and/or newly generated execution plan may be generated such that they are semantically equivalent to a received query that has been temporarily stored or a temporarily stored transformation of the received query (referred to herein as the received query). In other words, the received query and the transformed query, if executed independently against the same data, would produce equivalent result sets, even if the result sets are assembled in different manners by the two queries. Similarly, the received query and the newly generated execution plan, if executed independently against the same data, would produce equivalent result sets, even if the results sets are assembled in different manners by the two queries. Result sets are equivalent when they provide the data requested by a query or execution plan and represent the same data.

Semantically equivalent queries may have other byproducts besides the result sets, and these byproducts do not need to be the same or even similar. For example, execution of one query could cause creation and use of a data structure to produce a result set more efficiently, and execution of a semantically equivalent query might not create or use the data structure at all. The data structure may or may not persist after execution of the query.

With knowledge of which tables are candidate fact tables and/or which tables are candidate dimension tables, the query processor may cause relational queries to be more efficiently executed against multidimensional data without requiring the user to provide additional metadata that describes the tables as being either fact tables or dimension tables.

The query processor may include machine components, such as a computer system operating a standalone optimizer or an optimizer that is integrated with a server. The query processor may include stored instructions, such as optimizer instructions or integrated optimizer and server instructions, that specially configure a machine to process queries. The query processor operates to implement a process, such as an optimizer or an integrated optimizer and server process, that operates on a machine.

FIG. 2 illustrates an example server-client system for analyzing queries, transforming queries, and executing queries against a database. As shown, user 200 interacts with application 202 to send a query 204 to optimizer 205. Optimizer 205 may be separate from execution engine 206 as shown. Alternatively, Optimizer 205 and execution engine 206 may operate on same or different devices and may have a high amount or low amount of integration with each other. Optimizer 205 rewrites the query or generates an execution plan that is based on the query or a transformation of the query. Optimizer 205 sends the rewritten query or execution plan to execution engine 206. Execution engine 206 then executes the rewritten query or execution plan against database 208 and returns results 210 to application 202.

Figure 3:
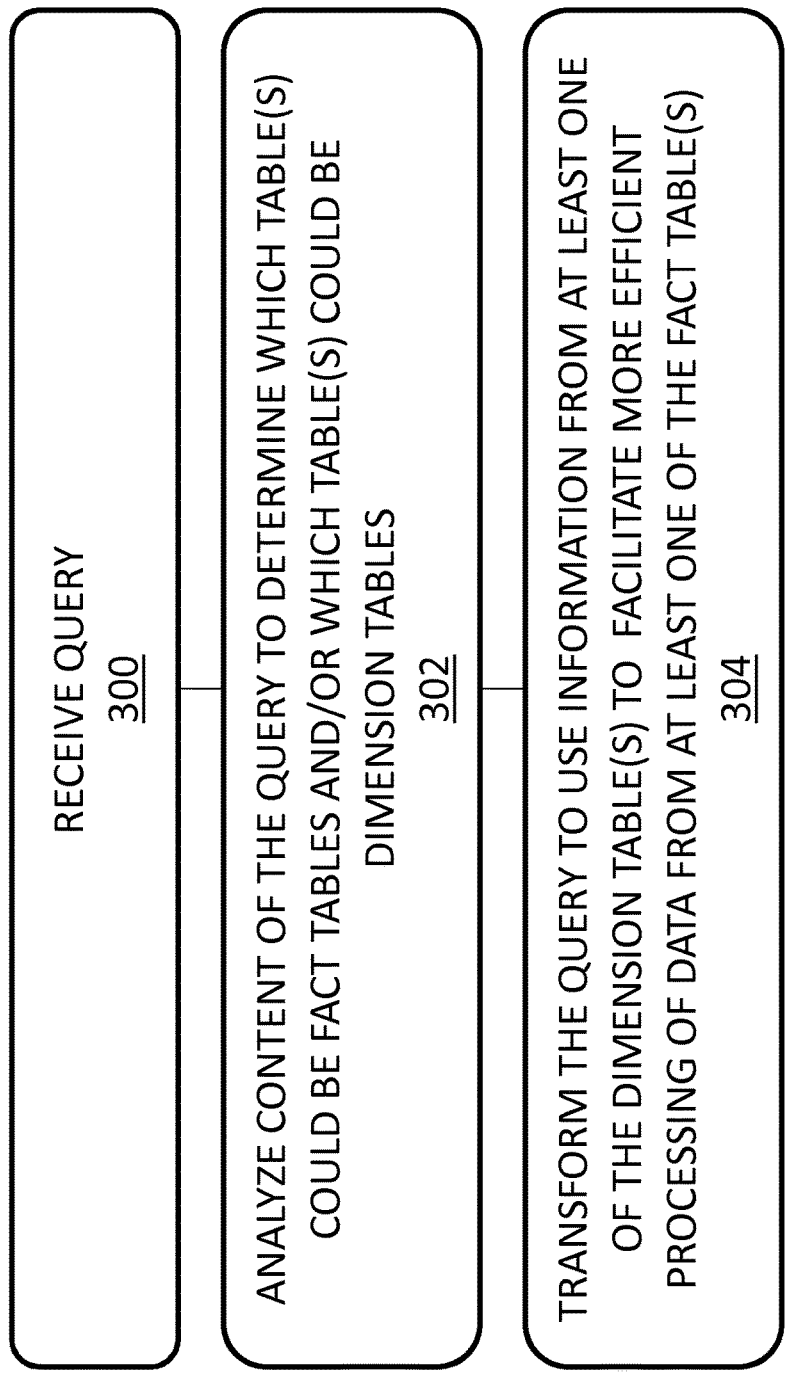
FIG. 3 illustrates an example process for inferring dimensional metadata from content of a query that references tables.

FIG. 3 illustrates an example process for inferring dimensional metadata from content of a query that references tables. As shown, a query processor receives a query in step 300. In step 302, the query processor analyzes content of the query to determine which table(s) could be fact tables and/or which table(s) could be dimension tables. The analysis may account for one or more stored heuristics or rules about whether tables qualify as candidate fact tables or candidate dimension tables. In step 304, the query processor transforms the query to use information from at least one of the dimension table(s) to facilitate more efficient processing of data from at least one of the fact table(s).

Analyzing Content of the Query and Transforming the Query

In various examples, upon analysis of the query, the query processor may determine that the query could be executed such that some of the tables are treated as either fact tables or dimension tables, some of the tables are treated only as fact tables, and/or some of the tables are treated only as dimension tables. For example, the query processor may analyze the structure and layout of the query to make such a determination. If the query processor determines that the query has multiple candidate fact tables, the query processor may generate, for each of at least some of the candidate fact tables, different transformed queries or different execution plans that cause the respective candidate fact tables to be processed before respective dimension tables. A table may be treated as a candidate fact table in one transformed query or execution plan and as a candidate dimension table in other transformed queries or execution plans.

During query analysis, the query processor may consider only the content of the query itself, only the query content in combination with other metadata received with the query, or the query content and other metadata, whether or not such metadata was received with the query. When analyzing the content of the query, the query processor may look at the syntax of the query, the database objects referenced by the query, the operations performed with respect to these objects alone, the join operations that connect multiple objects together, and/or the constraints placed on the objects.

In one embodiment, the query processor determines which of the referenced tables could be fact tables at least in part by determining which of the tables are referenced by aggregation operators or in other complex operations such as online analytical processing (OLAP) operations. Example aggregation operations include, but are not limited to, sums, maximums, minimums, and averages. Aggregation operations typically involve accumulating factual information or records of occurrences from the fact table, and, thus, tables referenced by aggregation operations are often, but not always, fact tables. For example, the MIN and MAX operations may be performed on either dimension tables or fact tables. On the other hand, the query processor may avoid generating query transformations or execution plans that would treat tables referenced by the SUM operation (or other aggregation operations that are not MIN or MAX) as dimension tables, due at least in part to the low likelihood that such an operation would be performed on a dimension table. Also, a set of possible query transformations that are available to the query processor might not include any transformations for queries that use these other aggregation operations on dimension tables.

In the same or a different embodiment, the query processor analyzes content of the query to identify the dimension table(s) at least in part by determining that the candidate fact table appears in equijoin(s) with the candidate dimension table(s). The equijoins are used in the query to join foreign keys from the fact table to keys of dimension tables.

Equijoins frequently appear in multidimensional queries to join fact tables to respective dimension tables and may also be used to detect multidimensional aspects of the query and to determine which tables are involved in the multidimensional aspects. For example, tables that do not appear in any equijoins may be excluded from consideration as candidate fact tables or candidate dimension tables.

The query processor may construct a star graph that summarizes which clusters of tables are joined together in the query. The star graph has separate entities, and the star graph may have several possible configurations where the only joins between separate entities are equijoins with the fact table and where all entities are connected. For each such configuration, the tables may be clustered such that each cluster contains all of the tables that are joined to each other by something that is not an equijoin or where both of the tables appear in the same aggregation or grouping key. Different configurations may have different entities or a greater or fewer number of entities based on the same query.

The clusters that are equijoined together in a configuration may be predicted to share a key in the manner that fact tables and dimension tables typically share keys. In one example, the query processor may look at the clusters and the relationships between the clusters to determine which tables likely have the most foreign keys and thus are the most likely to be fact tables.

In one example, the query processor analyzes content in the WHERE clause of the query to see constraints logically combined with AND or OR operators. Those constraints that are of the form col a=col b represent equijoins, and one of the referenced columns could be part of a fact table while the other referenced column could be part of a dimension table. For those constraints that are of the form col a<col b or col a>col b, constraints that represent semi-joins or anti-joins, or other non-equality constraints, both of the referenced columns may be treated together as fact tables or dimension tables.

In these examples with non-equality constraints, a join operation may be performed to construct the fact table or dimension table that results from the constraint, and the resulting table may be treated as a candidate fact table or a candidate dimension table for optimization purposes. For example, a first join operation may be performed to generate a dimension table, and a second join operation may be performed to generate a fact table. After these initial join operations, the dimension table may be processed before the fact table. The fact table may then be processed more efficiently using information from the pre-processed dimension table.

The query processor may use stored heuristics or rules to determine whether or not query is eligible for certain transformations that assume different tables are fact tables and different tables are dimension tables. In other words, the heuristics may specify rules for determining whether a table qualifies as a candidate fact table or a candidate dimension table. For example, some transformations may be effective to reduce the cost of query execution for complex online analytical processing (OLAP) operations such as aggregation operations performed against a fact table. In order to qualify for these transformations, the query would need to have such a complex OLAP operation that references the candidate fact table. In the example, the heuristics may look for each table or cluster of tables that is both referenced by a complex OLAP operation and appears in one or more equijoin operations with one or more candidate dimension tables.

In one example, the stored heuristics instruct the query processor to look for columns in a group by expression or in an aggregation operation. If there are multiple columns in an aggregation operation, the heuristics may predict that these columns, together, represent the fact table. Accordingly, the query processor may generate a candidate transformed query or new candidate execution plan that treats these columns as the fact table. The candidate transformed query or new candidate execution plan may be further analyzed to determine whether or not such transformed query or candidate execution plan is expected to be more efficient than the received query. If there are multiple columns together in a group by expression, the heuristics may predict that these columns, together, represent either the fact table or a single dimension. In other words, a grouping key expression heuristic may be used to determine whether columns come from the same entity, whether that entity is a fact table or a dimension.

In one embodiment, the transformed query or newly generated execution plan uses information from candidate dimension tables to facilitate more efficient processing of candidate fact tables. For example, the candidate dimension tables may be processed in whole or in part to establish range information or to create temporary data structures before the fact table is processed in whole or in part. Although the transformed query or newly generated execution plan is configured to use the dimension tables to facilitate processing of the fact table, the original query, as received, did not use the dimension tables in such a manner. Having knowledge of which tables may be dimension tables may allow the query processor to cause a more efficient re-ordering of operations that would have been performed in order to complete the query. The query processor may even insert new operations that would not have been performed but may facilitate more efficient processing of the fact table.

In one embodiment, the query processor and/or execution engine may use pseudo-SQL during query transformation and/or query execution. The pseudo-SQL might not conform to standard SQL but may be recognized by particular query processors and particular execution engines. In other words, the pseudo-SQL may be vendor-specific. The pseudo-SQL syntax may include any syntax that is helpful for referencing the entities and operations involved in query execution, and the pseudo-SQL syntax may be processed internally without being exposed to the application or user and without affecting the accuracy of query results. In other words, the pseudo-SQL syntax may be semantically equivalent to the received query.

In one example, the query processor receives an example query such as Query 2 below.

---
QUERY 2
---
SELECT sum(s.amount_sold), cu.cust_state_province, co.country_name
FROM sales s, customers cu, countries co
WHERE s.cust_id = cu.cust_id
    AND cu.country_id = co.country_id
GROUP BY cu.cust_state_province, co.country_name;
---

In this case, the query processor identifies "sales" as the fact table, and "customers" and "countries" as belonging to the same dimension. In other words, the query processor identifies one fact table and one dimension (comprising two tables). The dimension is equijoined with the fact table according to the operation s.cust_id=cu.cust_id. In other words, the cust_id column in s holds the foreign key, and the cust_id column in cu holds the key for the dimension. In other examples, the fact table may have multiple foreign keys with multiple dimensions, as indicated by multiple equijoins between the fact table and dimension tables.

Based on the received query, the query processor may generate a candidate transformed query or a candidate execution plan. The candidate query or plan would cause the dimension (comprising customers and countries in the example) to be processed before the fact table (sales in the example). In the example, other tables were not selected as fact tables because the other tables were not part of any aggregation operation or complex online analytical processing (OLAP) operation.

If the query had selected MAX(cu.cust_state_province) instead of cu.cust_state_province, then, due to the aggregation on the customers table, the customers table may have also been considered as a candidate fact table. If customers is the fact table, customers would join to sales and countries, and sales and countries would be separate dimensions. The separate dimensions could be processed before the customers table in a candidate query or execution plan.

If multiple candidate queries are determined, the multiple candidate queries may be passed to a costing mechanism that estimates a cost of executing the queries and selects one of the queries based on the cost. In the example, the costing mechanism would choose the query that has sales as the fact table because doing so would result in a lower cost as determined by the costing mechanism.

In one embodiment, the query processor transforms Query 2 into two sub-queries that, together, are semantically equivalent to Query 2. The first sub-query populates a temporary table, and also (as an intended side effect) creates and populates a data structure, called an XLATE, based on data from the dimension. The second sub-query scans the fact table, looking values up in the data structure, the XLATE, performs a vector aggregation, and then joins the result to the temporary table (to recover the grouping keys).

An example of the first sub-query is provided below as Sub-Query 1, shown with optional comments.

| SUB-QUERY 1 |
|---|
| INSERT INTO sys.sys_temp_xxxx<br>SELECT<br>    -- create XLATE, ID 0, to translate join keys cu.cust_id to<br>    (Dense Grouping Key (DGK) for)<br>    -- grouping keys (cu.cust_state_province, co.country_name)<br>    SYS_OP_XLATE_CREATE(0) JOIN KEYS(cu.cust_id)<br>    GROUPING<br>KEYS(cu.cust_state_province, co.country_name) c0,<br>    -- store grouping key co.country_name in the temp table<br>    max(co.country_name) c1,<br>    -- store grouping key cu.cust_state_province in the temp table<br>    max(cu.cust_state_province) c2,<br>    -- extra stuff in case XLATE creation fails<br>    SYS_OP_XLATE_SUCCEEDED(cu.cust_id, 0) c3<br>FROM<br>    -- the (two) dimension tables for this dimension<br>    countries co,<br>    customers cu<br>WHERE<br>    cu.country_id = co.country_id<br>GROUP BY<br>    SYS_OP_XLATE_CREATE(0) JOIN KEYS(cu.cust_id)<br>    GROUPING<br>KEYS(cu.cust_state_province, co.country_name),<br>    SYS_OP_XLATE_SUCCEEDED(cu.cust_id, 0),<br>    -- even more extra stuff in case XLATE creation fails<br>SYS_OP_XLATE_SUCCEEDED(sys_guid( ),0) |

An example of the second sub-query is provided below as Sub-Query 2, shown with optional comments.

| SUB-QUERY 2 |
|---|
| SELECT<br>    -- aggregation comes from fact inline view (below)<br>    SUM("VW_VT_0737CF93".item_1) "SUM(S.AMOUNT_SOLD)",<br>    -- grouping keys come from dimension temp table<br>    tt_vt_3.c2 "CUST_STATE_PROVINCE",<br>    tt_vt_3.c1 "COUNTRY_NAME"<br>FROM<br>    ( SELECT<br>        -- the "vector group by"<br>        sum(s.amount_sold) item_1,<br>        -- the "XLATE use" (look up s.cust_id in the XLATE)<br>        SYS_OP_XLATE_USE(0) INNER JOIN KEYS(s.cust_id) item_6,<br>        -- extra stuff in case XLATE creation fails<br>        SYS_OP_XLATE_SUCCEEDED(s.cust_id, 0) item_7<br>    FROM<br>        -- the fact table<br>        sales s<br>    GROUP BY<br>        SYS_OP_XLATE_USE(0) INNER JOIN KEYS(s.cust_id),<br>        SYS_OP_XLATE_SUCCEEDED(s.cust_id, 0)<br>    ) "VW_VT_0737CF93",<br>    sys.sys_temp_xxxx tt_vt_3<br>WHERE<br>    "VW_VT_0737CF93".item_6 = tt_vt_3.c0 AND<br>    "VW_VT_0737CF93".item_7 = tt_vt_3.c3<br>GROUP BY<br>    tt_vt_3.c2, tt_vt_3.c1 |

In addition to or as an alternative to transforming Query 2 into Sub-Query 1 and Sub-Query 2, the query processor may also generate an execution plan that carries out Sub-Query 1 and Sub-Query 2 and is semantically equivalent to Query 2. An example of the execution plan is provided below as Execution Plan 1.

| EXECUTION PLAN 1 | | | |
|---|---|---|---|
| | Id | Operation | Name |
| | 0 | SELECT STATEMENT | |
| | 1 | TEMP TABLE TRANSFORMATION | |
| | 2 | LOAD AS SELECT | SYS_TEMP_XXXX |
| | 3 | VECTOR GROUP BY | |
| | 4 | XLATE CREATE BUFFERED | :XL0000 |
| * | 5 | HASH JOIN | |
| | 6 | TABLE ACCESS FULL | COUNTRIES |
| | 7 | TABLE ACCESS FULL | CUSTOMERS |
| | 8 | HASH GROUP BY | |
| * | 9 | HASH JOIN | |
| | 10 | VIEW | VW_VT_0737CF93 |
| | 11 | VECTOR GROUP BY | |
| | 12 | HASH GROUP BY | |
| | 13 | XLATE USE | :XL0000 |
| | 14 | PARTITION RANGE ALL | |
| | 15 | TABLE ACCESS FULL | SALES |
| | 16 | TABLE ACCESS FULL | SYS_TEMP_XXXX |

Example Predicate Information (identified by operation id) for Example Execution Plan 1 is provided below.

5 - access("CU"."COUNTRY_ID"="CO"."COUNTRY_ID")
9 - access("ITEM_6"=INTERNAL_FUNCTION("C0") AND "ITEM_7"="C3")

Example Column Projection Information (identified by operation id) for Example Execution Plan 1 is provided below.

```
    1 - "C2"[VARCHAR2,40], "C1"[VARCHAR2,40], SUM("ITEM_1")[ ]
    2 - SYSDEF[ ], SYSDEF[ ], SYSDEF[ ], SYSDEF[ ], SYSDEF[ ]
    3 - (#keys=3) SYS_OP_XLATE_CREATE(0) JOIN KEYS("CU"."CUST_ID") GROUPING
KEYS("CU"."CUST_STATE_PROVINCE","CO"."COUNTRY_NAME")[ ],
SYS_OP_XLATE_SUCCEEDED("CU"."CUST_ID",0) [ ],
SYS_OP_XLATE_SUCCEEDED(SYS_GUID( ),0) [ ], MAX("CO"."COUNTRY_NAME")[ ],
MAX("CU"."CUST_STATE_PROVINCE")[ ]
    4 - (#keys=2) "CU"."CUST_STATE_PROVINCE"[VARCHAR2,40],
"CO"."COUNTRY_NAME"[VARCHAR2,40],"CU"."CUST_ID"[NUMBER,22],
"CO"."COUNTRY_ID"[NUMBER,22], "CU"."COUNTRY_ID"[NUMBER,22] ,
SYS_OP_XLATE_CREATE(0) JOIN KEYS("CU"."CUST_ID") GROUPING
KEYS("CU"."CUST_STATE_PROVINCE","CO"."COUNTRY_NAME")[]
    5 - (#keys=1) "CO"."COUNTRY_ID"[NUMBER,22], "CU"."COUNTRY_ID"[NUMBER,22],
"CO"."COUNTRY_NAME"[VARCHAR2,40], "CU"."CUST_ID" [NUMBER,22],
"CU"."CUST_STATE_PROVINCE"[VARCHAR2,40]
    6 - (rowset=200) "CO"."COUNTRY_ID"[NUMBER,22],
"CO"."COUNTRY_NAME" [VARCHAR2,40]
    7 - (rowset=200) "CU"."CUST_ID"[NUMBER,22],
"CU"."CUST_STATE_PROVINCE"[VARCHAR2,40] , "CU"."COUNTRY_ID"[NUMBER,22]
    8 - (#keys=2) "C2"[VARCHAR2,40], "C1"[VARCHAR2,40], SUM("ITEM_1")[ ]
    9 - (#keys=2) "ITEM_6"[LONG,4], INTERNAL_FUNCTION("C0")[ ], "ITEM_7"[RAW,22],
"C3"[RAW,22], "ITEM_1"[NUMBER,22], "C0"[NUMBER,22], "C1"[VARCHAR2,40],
"C2"[VARCHAR2,40] , "C3"[RAW,22]
    10 - "ITEM_1"[NUMBER,22], "ITEM_6"[LONG,4], "ITEM_7"[RAW,22]
    11 - (#keys=2) SYS_OP_XLATE_USE(0) INNER JOIN KEYS("S"."CUST_ID")[ ],
SYS_OP_XLATE_SUCCEEDED("S"."CUST_ID",0) [ ], SUM("S"."AMOUNT_SOLD")[ ]
    12 - (#keys=2) SYS_OP_XLATE_USE(0) INNER JOIN KEYS("S"."CUST_ID")[ ],
SYS_OP_XLATE_SUCCEEDED("S"."CUST_ID",0) [ ], SUM("S"."AMOUNT_SOLD")[ ]
    13 - (rowset=200) "S"."CUST_ID"[NUMBER,22], "S"."AMOUNT_SOLD"[[NUMBER,22],
SYS_OP_XLATE_USE(0) INNER JOIN KEYS("S"."CUST_ID")[ ]
    14 - (rowset=200) "S"."CUST_ID"[NUMBER,22], "S"."AMOUNT_SOLD"[NUMBER,22]
    15 - (rowset=200) "S"."CUST_ID"[NUMBER,22], "S"."AMOUNT_SOLD"[NUMBER,22]
    16- "C0"[NUMBER,22], "C1"[VARCHAR2,40], "C2"[VARCHAR2,40], "C3"[RAW,22]
```

Accounting for Metadata

When determining the metadata, factors that may be or may not be considered, or may be considered in a weighted combination, include but are not limited to: estimated execution cost(s) of the query, size(s) of table(s) referenced by the query, as indicated by metadata stored about the table(s); a pattern of access to table(s) referenced by the query, including how often insert operations, update operations, or read-only operations are performed on the table(s); a number of indexes or materialized views related to the table(s); whether or not such indices or materialized views are stale; user-specified or application-specified data that describes the table(s) and is received with but separate from the query; user-specified or application-specified data that describes the table(s) and is stored in association with the table(s) but is not received with the query; other data that describes the table(s) and is received with but separate from the query; and/or other data that describes the table(s) and is stored in association with the table(s).

The query processor may generate an execution plan or transformed query or select a generated execution plan or transformed query based at least in part on an estimated execution cost for the execution plan or transformed query. For example, a candidate query may be generated or selected for execution upon determining that the candidate query is expected to save a threshold amount of time or computing resources or upon determining that the candidate query is expected to use less time or computing resources than other candidate queries.

In one embodiment, the query processor selects candidate fact table(s) and/or candidate dimension table(s) in a candidate query or queries based on the content of the query alone or based on a limited number of factors. The query processor may then send the candidate queries to a costing framework that estimates the cost of executing received queries by considering additional factors that might not be available to the query processor. The costing framework may select the query with the lowest expected cost, and cause execution of the selected query or generate an execution plan to save or send to an execution engine for later execution of the selected query.

The costs of candidate queries may be calculated based on a variety of factors, one of which may include the size(s) of the tables selected as candidate fact tables. The query processor may either generate an execution plan or transformed query or select a generated execution plan or transformed query based at least in part on a size of a candidate fact table in the execution plan or transformed query. For example, a candidate query may be generated or selected for execution upon determining that the candidate query uses, as its candidate fact table, a table above a threshold size or a table that is larger than other tables referenced by the query. In another example, a candidate query may be selected from among a plurality of candidate queries upon determining that the candidate query uses, as its candidate fact table, a table that is larger than the candidate fact tables in the other candidate queries. Alternatively, the candidate query may be generated or selected upon determining that the candidate query uses, as its candidate dimension table(s), table(s) that are smaller than candidate dimension tales in other candidate queries.

Accesses to dimension tables are generally more likely to be read-only accesses than accesses to fact tables, and this information can be used to identify dimension tables without actually knowing which tables are fact tables and which tables are dimension tables. In this example, the query processor may generate or select a candidate query for execution upon determining that the candidate query uses, as its candidate fact table, a table that has been frequently accessed for insert or update operations. Alternatively, the candidate query may be generated or selected upon determining that the candidate query uses, as its candidate dimension table(s), table(s) that are infrequently accessed for insert or update operations.

The query processor may also consider other tracked data about the tables that may be correlated with whether the table is a fact table or a dimension table, such as a number of indexes or materialized views related to the table or whether those materialized views or indices are stale. Due to frequent inserts or updates, fact tables in systems with a high amount of input/output may have a low chance of having indices or materialized views that have not been marked stale due to such inserts or updates.

In other examples, an application or user may flag or mark certain tables as fact tables or dimension tables or cause data to be stored that identifies tables as fact tables or dimension tables. Such data may also be stored by the server itself or maintained in the database in association with the tables regardless of the source of the data.

Evaluating the Query Against the Identified Dimension Tables and Fact Tables

Once the content of a query has been evaluated, optionally considering additional metadata, to identify fact table(s) and dimension table(s) in the query, the query may be executed in a manner that takes advantage of this additional information. A server may take advantage of this information by processing data from dimension tables before processing data from a fact table, and using the data from the dimension tables to facilitate more efficient processing of the fact table. For example, the server may construct data structures based on the dimension tables and use these data structures to complete aggregation operations or other complex online analytical processing (OLAP) operations on the fact table.

In another example, the server may make further inferences based on characteristics that are commonly present in fact tables or dimension tables. For example, the server may allocate less computing resources to handling the dimension tables and more computing resources to handling the fact tables. In another example, the server may fetch or create an index for fact tables but not for dimension tables or vice versa. In a previously mentioned example, the server may process dimension tables in whole or in part before fact tables. In yet another example, the server could use the information about which tables are fact tables and which tables are dimension tables to execute lag or lead analytic functions that are designed to work on multidimensional data, or to perform random access within a cube that is designed to work on multidimensional data.

In one embodiment, the server places relevant data from identified dimension tables in their own in-line view and relevant data from identified fact tables in their own in-line view. In one example, the fact table has foreign keys for several dimensions, and a separate in-line view is used for each of these dimensions. The in-line view(s) for dimension tables may be processed, in whole or in part, before processing the in-line view(s) for fact tables. After processing the in-line views for both the dimension table(s) and fact table(s), the results may be joined together to form a results set.

The server may use information about whether a table is a fact table or a dimension table to perform subsequent query transformations and/or generate additional execution plans. Such information may be used to push processing of the fact table back until data from the dimension table has been processed to a point that the data is efficiently useable during processing of the fact table. Small improvements in efficiency may be magnified for larger fact tables.

The server may create different storage containers corresponding to different combinations of values in a range of value combinations or compressed range of value combinations in the dimensions. The range of value combinations may be compressed from actual value combinations to set identifiers that identify the value combinations. The set identifiers may be consecutive integers. The server may then perform aggregation operation(s) on the fact table by placing data from the fact table into the different storage containers. As data is aggregated using the different containers, either the data placed into an empty container that corresponds to a set identifier that describes a row of the fact table from which the data originated, or the data is aggregated with data in a non-empty container that corresponds to the set identifier that describes the row of the fact table from which the data originated.

For example, the server may receive a query that aggregates data from fact table(s) and references dimension table(s). For a set of column(s) of the dimension table(s), the server may create a data structure comprising different storage containers for each different set of value(s) that occur in the set of column(s). The different storage containers are mapped to different rows of the dimension table(s). The server may then evaluate the query to aggregate data from the fact table(s) at least in part by using keys in the fact table(s) to locate corresponding storage containers of the different storage containers.

Example aggregation operations include, but are not limited to, sums, maximums, and minimums. In each of these examples, a storage container holds a rolling aggregate value that is initialized to zero or null and is aggregated iteratively as new data is placed into the storage container. Other aggregation operations, such as averages, are also possible. For example, an average could be computed using the storage containers to hold a tuple comprising a rolling sum and a rolling number of rows that contributed to the rolling sum. Once the server is finished filling the storage containers, the average may be computed by dividing the rolling sum by the rolling number of rows.

In another embodiment, rather than aggregated-as-you-go or rolling aggregation, the data is aggregated in the different storage containers after the individual data values have been stored in the different storage containers. In this embodiment, as data is aggregated using the different data containers, either the data placed into an empty container that corresponds to a set identifier that describes the row of the fact table from which the data originated, or the data is appended to data in a non-empty container that corresponds to the set identifier that describes the row of the fact table from which the data originated. After the server has accounted for all of the relevant data, the sequences of appended data in the containers may be aggregated on a container-by-container basis.

Multiple queries may be received and executed using the same data structure. A data structure containing aggregated data or other processed data may be generated during the execution of one of the queries, and the data structure may be re-used for another of the queries. For example, the server may determine that the other query is a query that, if executed, could use at least part of data that has been aggregated in the different storage containers of the data structure, and the server could re-use at least part of the aggregated data in the different storage containers to evaluate the other query.

Example Query 3, which requests aggregation over the quantity column of the fact table (SUM(S.QTY)), is provided below.

| QUERY 3 |
| --- |
| SELECT p.cat, g.country, g.state, sum(s.qty)<br>FROM sales s, prod p, geog g<br>WHERE s.gid = g.gid AND s.pid=p.pid<br>    AND g.state in 'WA' 'CA' AND p.mfg = 'GE' AND p.cat in<br>('APPLIANCE', 'ELECTRIC')<br>GROUP BY p.cat, g.country, g.state |

FIG. 4 illustrates an example data structure that was created based on dimension tables 104 and 106 from FIG. 1 to store aggregate data gathered from the fact table 402 according to example Query 3. Data structure 412 shows an example 2×2 aggregation array for holding aggregate values from fact table 402. In the example, Data structure 412 holds a rolling sum that is updated as values are processed from the fact table or a delayed sum that is computed after the values have been processed from the fact table. Data structure 412 is initialized such that each of the cells is zero or null. When analyzing the first row of the fact table, the server may map GID=2 to the second row of data structure 310 and PID=8 to the eighth row of data structure 308 to determine that the first row of the fact table falls under the storage container identified as {DSIG=1, DSIP=2}. Accordingly, under the rolling sum approach, the value of 50 (the quantity for row 1 of the fact table) is stored in (1,2) of data structure 412.

The server may continue to process rows, reaching row 7, which also maps to the storage container identified as {DSIG=1, DSIP=2}. Under the rolling sum approach, the server updates the value stored in (1,2) of data structure 412 by adding 40, which is the quantity for row 7 of the fact table. After processing row 7, data structure 412 may store a value of 90 (50+40) in (1,2).

Continuing with the example, the server may reach row 10 of the fact table, which also maps to the storage container identified as {DSIG=1, DSIP=2}. Under the rolling sum approach, the server updates the value stored in (1,2) of data structure 412 by adding 20, which is the quantity for row 10 of the fact table. After processing row 10, data structure 412 may store a value of 110, as shown in FIG. 4.

After storing the aggregates into an aggregation data structure 412, the server may generate a result set by mapping the cells from the aggregation data structure back to the value combinations that they represent. For example, the cell (1, 2) may be mapped, using data structures 410 and 408, back to row 2 of the geography table (from row 2 of data structure 410) and row 6 of the products table (from row 6 of data structure 408). These rows represent the overall value combination of {COUNTRY=USA, STATE=WA, MFG=GE, CAT=ELECTRIC}. Other cells of the aggregation data structure may also be similarly mapped back to the original value combinations that they represent.

Example Query Transformations that Prepare a Relational Query for Multidimensional Processing SQL is a relational, not multi-dimensional, query language; queries written in SQL may be similar to multi-dimensional queries, but have certain features that make executing these queries using multi-dimensional OLAP difficult or impossible. Some SQL queries may be transformed such that they are more compatible with multidimensional treatment even though the calculations may be performed using relational queries.

In a first example, a relational query includes a fact join key or foreign key that is joined to a dimension join key, and the query is grouped by the fact join key. Such a query may be difficult to process using multidimensional optimizations in SQL. The query processor may rewrite the query by replacing the fact join key expression that appears in the group by operation with the corresponding dimension join key expression. In a particular example, the initial query may be of the form, "SELECT . . . FROM dim d, fact f WHERE f.x=d.x AND . . . GROUP BY f.x, . . . ;" The initial query may be rewritten to " . . . GROUP BY d.x, . . . ". The transformation allows the grouping key expression "d.x" to be more fully analyzed, because d.x may be processed during the (relatively small) dimension scan, rather than "f.x," which is processed during the (relatively large) fact scan.

In a second example, unnecessary aggregation may be removed from or shifted in the initial query if the initial query includes such aggregation on a column that would otherwise qualify as a dimension. A relational query that references MAX(c) may be rewritten to reference c itself. A MAX of a column is the same as a max of a distinct of that column because duplicates do not affect the result of the MAX operation. The query processor may move the column out of the aggregation operation (i.e., MAX) and add the column to a group by operation to make it distinct. Then, the query processor may place the MAX operation in a top-level outer query. In a particular example, the initial query may be of the form, "SELECT . . . state, MAX(country) . . . FROM . . . WHERE . . . GROUP BY state;" The query processor moves "country" out of the aggregation, "MAX (country)", and adds country as another GROUP BY column, to make multi-dimensional query optimizations available to the query. Upon analyzing the columns country and state, the query processor may be able to further avoid needing an extra GROUP BY column for "country," since "country" is determined entirely by "state." The transformation also works to remove a column out of a MIN aggregation.

In a third example, the query processor reduces the number of redundant joins from snowflake dimensions to the fact table. In relational SQL, it may be beneficial for optimization purposes to have as many redundant joins as possible. In fact, the server may automatically add in redundant joins that the application or user omitted. For example, the initial query may be of the form, "SELECT . . . FROM fact f, dim1 d1, dim2 d2 WHERE f.x=d1.x AND d1.x=d2.x AND f.x=d2.x." The query processor may remove "f.x=d2.x" from the above example; also, if " . . . d1.x= d2.x . . . " had been omitted, the server may have added that expression to the initial query. Removing redundant joins may allow the server to use fewer indexes if the server uses one index per join key for the query. Alternatively, removing redundant joins may allow the server to create and use a simpler and possibly faster dense data structure during query evaluation.

Extensions and Alternatives

Various examples herein refer to dimension table(s), dimension(s), and fact table(s), but the examples may also apply to tables, columns, or other database objects that are not characterized as such. For example, the examples herein may be applicable in scenarios where one table is smaller than another table, regardless of whether the smaller table is a dimension table and regardless of whether the larger table is a fact table. In another example, the server may guess whether a table is a fact table or a dimension table based on a size of the table and position(s) of reference(s) to the table in a query, but the server may or may not verify the accuracy of this guess.

Various examples herein refer to receiving, processing or analyzing a query. As used herein, a query may refer to individual query blocks, which are separately consumable chunks of query language. Query blocks are processed to provide separate sets of results, but result sets from multiple query blocks could be combined to form another set of results. In other words, separate queries, as referred to herein, may actually be separately consumable sub-queries of a higher-level query.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
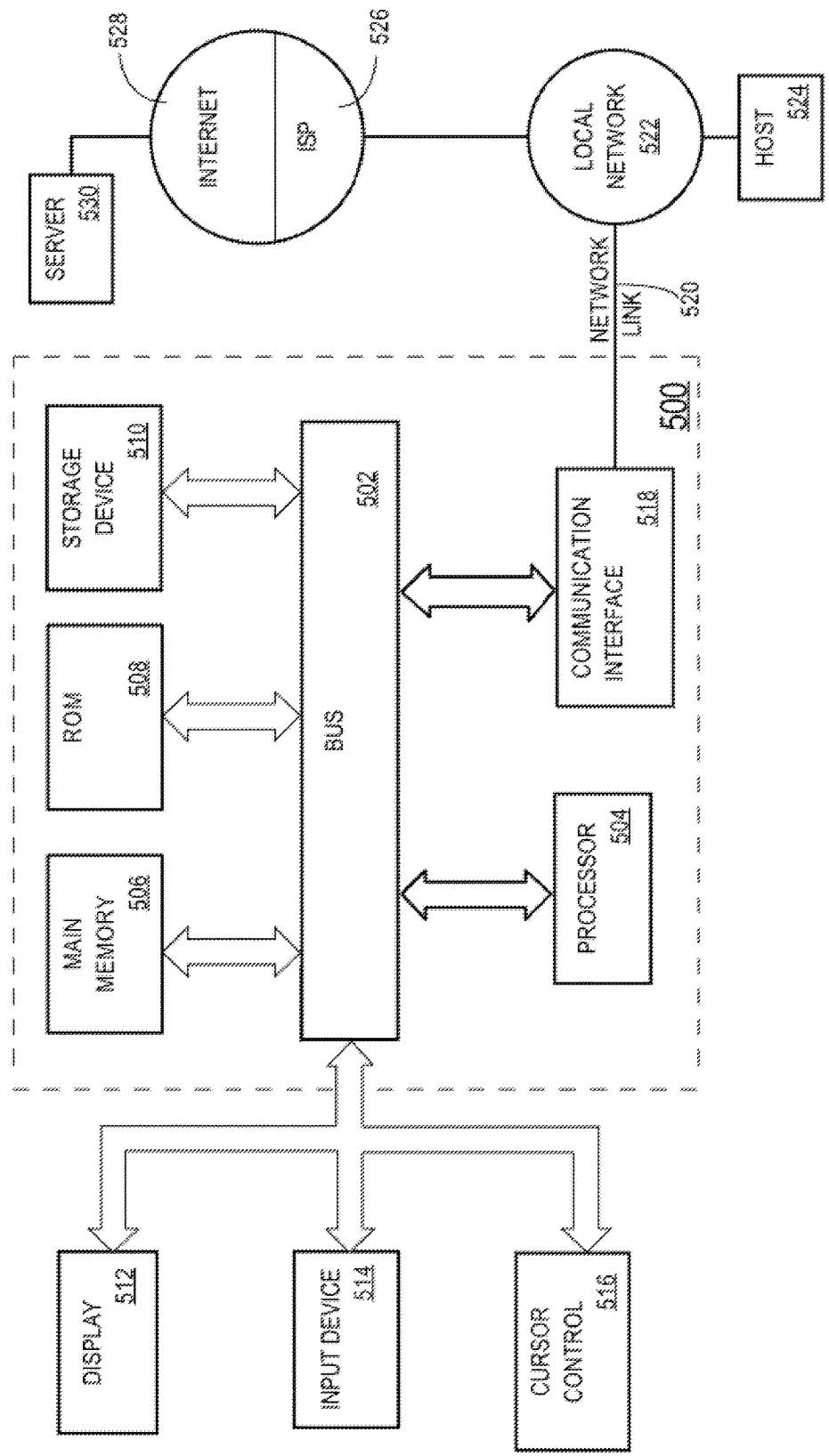
FIG. 5 illustrates an example computer system that may be specially configured according to the various embodiments described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
 storing a query that references multiple tables;
 analyzing operations the query specifies on the multiple tables to detect at least one of:
  two particular tables of the multiple tables could be dimension tables by detecting a join of the two particular tables of said multiple tables that does not comprise an equijoin, or
  one or more particular tables of the multiple tables could be fact tables by detecting at least one of:
   a minimum operation, a maximum operation, an average operation, a summation operation,
   an online analytical processing (OLAP) function based on a table of said multiple tables, or
   a group by operation based on multiple columns of a table of said multiple tables;
 identifying one or more candidate dimension tables of the multiple tables at least in part by determining, based at least in part on content of the query, that a particular candidate fact table of the multiple tables appears in one or more equijoins with the one or more candidate dimension tables;
 based at least in part on determining which of the multiple tables could be fact tables, generating an execution plan for the query, the execution plan operating on the particular candidate fact table and the one or more candidate dimension tables;
 wherein the execution plan, when performed, processes at least some data from at least one dimension using at least one of the one or more candidate dimension tables before processing at least some data from the particular candidate fact table;
 wherein the method is performed by one or more computing devices.

2. The method of claim 1, wherein determining which of the multiple tables could be fact tables comprises determining which of the multiple tables are referenced by aggregation operators.

3. The method of claim 1, wherein determining which of the multiple tables could be fact tables does not account for sizes of the multiple tables.

4. The method of claim 1, wherein generating an execution plan for the query comprises generating multiple execution plans, the multiple execution plans including one or more execution plans for each of one or more candidate fact tables of the multiple tables, the method further comprising selecting, from among the multiple execution plans, the execution plan that operates on the candidate fact table of the one or more candidate fact tables and the one or more candidate dimension tables based at least in part on a size of the candidate fact table.

5. The method of claim 1, wherein analyzing operations the query specifies on the multiple tables comprises detecting that one or more particular tables of the multiple tables could be fact tables by detecting at least one of:
 an online analytical processing (OLAP) function based on a table of said multiple tables, or
 a group by operation based on multiple columns of a table of said multiple tables.

6. The method of claim 1, wherein detecting that one or more particular tables of the multiple tables could be fact tables comprises detecting a minimum operation, a maximum operation, an average operation, or a summation operation.

7. A method comprising:
 storing a query that references multiple tables;
 analyzing operations the query specifies on the multiple tables to detect at least one of:
  two particular tables of the multiple tables could be dimension tables by detecting a join of the two particular tables of said multiple tables that does not comprise an equijoin, or
  one or more particular tables of the multiple tables could be fact tables by detecting at least one of:
   a minimum operation, a maximum operation, an average operation, a summation operation,
   an online analytical processing (OLAP) function based on a table of said multiple tables, or
   a group by operation based on multiple columns of a table of said multiple tables;
 identifying one or more candidate dimension tables of the multiple tables at least in part by determining, based at least in part on content of the query, that a particular candidate fact table of the multiple tables appears in one or more equijoins with the one or more candidate dimension tables;
 based at least in part on determining which of the multiple tables could be fact tables, transforming the query to a transformed query that operates on the particular candidate fact table and the one or more candidate dimension tables wherein the transformed query, when executed, processes at least some data from at least one dimension using at least one of the one or more candidate dimension tables before processing at least some data from the particular candidate fact table;

wherein the method is performed by one or more computing devices.

8. The method of claim 7, wherein determining which of the multiple tables could be fact tables comprises determining which of the multiple tables are referenced by aggregation operators.

9. The method of claim 7, wherein determining which of the multiple tables could be fact tables does not account for sizes of the multiple tables.

10. The method of claim 7, wherein the query is transformed into multiple transformed queries, including one or more transformed queries for each of one or more candidate fact tables of the multiple tables, the method further comprising selecting, from among the multiple transformed queries, the transformed query that operates on the candidate fact table of the one or more candidate fact tables and the one or more candidate dimension tables based at least in part on a size of the candidate fact table.

11. The method of claim 7, further comprising:
determining that the query includes a particular fact key that is joined to a particular dimension key and that the query includes a group by operation that references the particular fact key; and
based at least in part on determining that the query includes the particular fact key that is joined to the particular dimension key and that the query includes a group by operation that references the particular fact key, replacing the particular fact key in the group by operation with the particular dimension key.

12. The method of claim 7, further comprising:
determining that the query includes a maximum operation or minimum operation that references a group by operation and a particular column of a table of the one or more candidate dimension tables; and
based at least in part on determining that the query includes the maximum operation or minimum operation that references the particular column, moving the particular column out of the maximum operation or minimum operation and into the group by operation.

13. The method of claim 7, further comprising:
determining that the query includes one or more redundant join operations; and
based at least in part on determining that the query includes the one or more redundant join operations, removing at least one of the one or more redundant join operations from the query.

14. One or more non-transitory computer-readable storage media storing sequences of instructions which, when executed by one or more processors, cause:
storing a query that references multiple tables
analyzing operations the query specifies on the multiple tables to detect at least one of:
two particular tables of the multiple tables could be dimension tables by detecting a join of the two particular tables of said multiple tables that does not comprise an equijoin, or
one or more particular tables of the multiple tables could be fact tables by detecting at least one of:
a minimum operation, a maximum operation, an average operation, a summation operation,
an online analytical processing (OLAP) function based on a table of said multiple tables, or
a group by operation based on multiple columns of a table of said multiple tables;
identifying one or more candidate dimension tables of the multiple tables at least in part by determining, based at least in part on content of the query, that a particular candidate fact table of the multiple tables appears in one or more equijoins with the one or more candidate dimension tables;
based at least in part on determining which of the multiple tables could be fact tables, generating an execution plan for the query, the execution plan operating on the particular candidate fact table and the one or more candidate dimension tables;
wherein the execution plan, when performed, processes at least some data from at least one dimension using at least one of the one or more candidate dimension tables before processing at least some data from the particular candidate fact table.

15. The one or more non-transitory computer-readable storage media of claim 14, wherein determining which of the multiple tables could be fact tables includes determining which of the multiple tables are referenced by aggregation operators.

16. The one or more non-transitory computer-readable storage media of claim 14, wherein determining which of the multiple tables could be fact tables does not include accounting for sizes of the multiple tables.

17. The one or more non-transitory computer-readable storage media of claim 16, wherein generating an execution plan for the query comprises generating multiple execution plans, the multiple execution plans including one or more execution plans for each of one or more candidate fact tables of the multiple tables, and wherein the sequence of instructions includes instructions that, when executed by one or more processors, cause selecting, from among the multiple execution plans, the execution plan that operates on the candidate fact table of the one or more candidate fact tables and the one or more candidate dimension tables based at least in part on a size of the candidate fact table.

18. One or more non-transitory computer-readable storage media storing sequences of instructions which, when executed by one or more processors, cause:
storing a query that references multiple tables;
analyzing operations the query specifies on the multiple tables to detect at least one of:
two particular tables of the multiple tables could be dimension tables by detecting a join of the two particular tables of said multiple tables that does not comprise an equijoin, or
one or more particular tables of the multiple tables could be fact tables by detecting at least one of:
a minimum operation, a maximum operation, an average operation, a summation operation,
an online analytical processing (OLAP) function based on a table of said multiple tables, or
a group by operation based on multiple columns of a table of said multiple tables;
identifying one or more candidate dimension tables of the multiple tables at least in part by determining, based at least in part on content of the query, that a particular candidate fact table of the multiple tables appears in one or more equijoins with the one or more candidate dimension tables;
based at least in part on determining which of the multiple tables could be fact tables, transforming the query to a transformed query that operates on the particular candidate fact table and the one or more candidate dimension tables;

wherein the transformed query, when executed, processes at least some data from at least one dimension using at least one of the one or more candidate dimension tables before processing at least some data from the particular candidate fact table.

19. The one or more non-transitory computer-readable storage media of claim 18, wherein determining which of the multiple tables could be fact tables includes determining which of the multiple tables are referenced by aggregation operators.

20. The one or more non-transitory computer-readable storage media of claim 18, wherein determining which of the multiple tables could be fact tables does not include accounting for sizes of the multiple tables.

21. The one or more non-transitory computer-readable storage media of claim 20, wherein the query is transformed into multiple transformed queries, including one or more transformed queries for each of the one or more candidate fact tables, and wherein the sequence of instructions includes instructions that, when executed by one or more processors, cause selecting, from among the multiple transformed queries, the transformed query that operates on the candidate fact table of the one or more candidate fact tables and the one or more candidate dimension tables based at least in part on a size of the candidate fact table.

22. The one or more non-transitory computer-readable storage media of claim 18, wherein the sequence of instructions includes instructions that, when executed by one or more processors, further cause:

determining that the query includes a particular fact key that is joined to a particular dimension key and that the query includes a group by operation that references the particular fact key; and based at least in part on determining that the query includes the particular fact key that is joined to the particular dimension key and that the query includes a group by operation that references the particular fact key, replacing the particular fact key in the group by operation with the particular dimension key.

23. The one or more non-transitory computer-readable storage media of claim 18, wherein the sequence of instructions includes instructions that, when executed by one or more processors, further cause:

determining that the query includes a maximum operation or minimum operation that references a group by operation and a particular column of a table of the one or more candidate dimension tables; and based at least in part on determining that the query includes the maximum operation or minimum operation that references the particular column, moving the particular column out of the maximum operation or minimum operation and into the group by operation.

24. The one or more non-transitory computer-readable storage media of claim 18, wherein the sequence of instructions includes instructions that, when executed by one or more processors, further cause:

determining that the query includes one or more redundant join operations; and based at least in part on determining that the query includes the one or more redundant join operations, removing at least one of the one or more redundant join operations from the query.

* * * * *

UNITED STATES PATENT AND TRADEMARK OFFICE
CERTIFICATE OF CORRECTION

| | | |
|---|---|---|
| PATENT NO. | : 9,990,398 B2 | Page 1 of 1 |
| APPLICATION NO. | : 14/033285 | |
| DATED | : June 5, 2018 | |
| INVENTOR(S) | : Hunter et al. | |

It is certified that error appears in the above-identified patent and that said Letters Patent is hereby corrected as shown below:

In the Specification

Column 1, Line 18, after "data" insert -- . --.

In the Claims

Column 22, Line 67, Claim 7, delete "tables" and insert -- tables; --, therefor.

Column 23, Line 55, Claim 14, delete "tables" and insert -- tables; --, therefor.

Signed and Sealed this
Fifth Day of February, 2019

Andrei Iancu
*Director of the United States Patent and Trademark Office*